(12) United States Patent
Hu et al.

(10) Patent No.: US 12,738,088 B2
(45) Date of Patent: Sep. 15, 2026

(54) PERSON RE-IDENTIFICATION METHOD, COMPUTER-READABLE STORAGE MEDIUM, AND TERMINAL DEVICE

(71) Applicant: UBTECH ROBOTICS CORP LTD, Shenzhen (CN)

(72) Inventors: Shuping Hu, Shenzhen (CN); Kan Wang, Shenzhen (CN); Huan Tan, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 701 days.

(21) Appl. No.: 18/078,027

(22) Filed: Dec. 8, 2022

(65) Prior Publication Data

US 2023/0386244 A1 Nov. 30, 2023

(30) Foreign Application Priority Data

May 31, 2022 (CN) ........................ 202210609192.0

(51) Int. Cl.
*G06V 40/10* (2022.01)
*G06F 18/211* (2023.01)
(Continued)

(52) U.S. Cl.
CPC .......... *G06V 40/103* (2022.01); *G06V 10/761* (2022.01); *G06V 10/776* (2022.01);
(Continued)

(58) Field of Classification Search
CPC .. G06V 40/103; G06V 10/761; G06V 10/776; G06V 10/771; G06V 10/82;
(Continued)

(56) References Cited

U.S. PATENT DOCUMENTS

2020/0090039 A1* 3/2020 Song ...................... G06V 10/82
2023/0386241 A1* 11/2023 Wang .................. G06V 10/764

FOREIGN PATENT DOCUMENTS

CN 114529946 A 5/2022
CN 114529969 A 5/2022

OTHER PUBLICATIONS

K. Zeng, et al., "Hierarchical Clustering with Hard-batch Triplet Loss for Person Re-identification", Jun. 2020, IEEE, 2020 IEEE/CVF Conference on Computer Vision and Pattern Recognition (CVPR), p. 13654-13662. (Year: 2020).*

(Continued)

*Primary Examiner* — Vincent Rudolph
*Assistant Examiner* — Timothy Choi

(57) ABSTRACT

A person re-identification method, a storage medium, and a terminal device are provided. In the method, a preset ratio-based triplet loss function is used as a loss function during training. The ratio-based triplet loss function limits a ratio of a positive sample feature distance to a negative sample feature distance to be less than a preset ratio threshold. The positive sample feature distance is a distance between a reference image feature and a positive sample image feature, and the negative sample feature distance is a distance between the reference image feature and a negative sample image feature. Compared with the existing absolute distance-based triplet loss function, in the case of small inter-class differences and large intra-class differences, the ratio-based triplet loss function can effectively improve the stability of model training, the features extracted by the trained model are more discriminative and robust, thereby improving the accuracy of person re-identification results.

3 Claims, 5 Drawing Sheets

S301
Obtain a pending person re-identification task

S302
Obtain a person re-identification result by processing the person re-identification task using a person re-identification model

(51) Int. Cl.
*G06V 10/74* (2022.01)
*G06V 10/77* (2022.01)
*G06V 10/771* (2022.01)
*G06V 10/774* (2022.01)
*G06V 10/776* (2022.01)
*G06V 10/82* (2022.01)
*G06V 20/52* (2022.01)
*G06V 40/16* (2022.01)

(52) U.S. Cl.
CPC .. *G06F 18/211* (2023.01); *G06T 2207/30196* (2013.01); *G06T 2207/30232* (2013.01); *G06V 10/74* (2022.01); *G06V 10/771* (2022.01); *G06V 10/7715* (2022.01); *G06V 10/774* (2022.01); *G06V 10/82* (2022.01); *G06V 20/52* (2022.01); *G06V 40/173* (2022.01)

(58) Field of Classification Search
CPC ...... G06V 20/52; G06V 40/173; G06V 10/74; G06V 10/7715; G06V 10/774; G06F 18/211; G06T 2207/30196; G06T 2207/30232
See application file for complete search history.

(56) References Cited

OTHER PUBLICATIONS

W. Zeng, et al., “Clustering-Guided Pairwise Metric Triplet Loss for Person Reidentification”, Jan. 31, 2022, IEEE, IEEE Internet of Things Journal, vol. 9, is. 16, p. 15150-15160. (Year: 2022).*
Yu et al., “Deep metric learning with dynamic margin hard sampling loss for face verification”, Dec. 2019, Springer-Verlag, Signal, Image and Video Processing (2020), vol. 14, p. 791-798 (Year: 2019).*
Wu et al., “Attention Deep Model With Multi-Scale Deep Supervision for Person Re-Identification”, Feb. 2021, IEEE, IEEE Transactions on Emerging Topics in Computational Intelligence, vol. 5, No. 1, p. 70-78. (Year: 2021).*
Qu et al., “A Multi-Fault Detection Method With Improved Triplet Loss Based on Hard Sample Mining”, Jan. 2021, IEEE, IEEE Transactions on Sustainable Energy, vol. 12, No. 1, p. 127-137. (Year: 2021).*
Yang et al., “Soft Ranking Threshold Losses for Image Retrieval”, Sep. 2021, IEEE, 2021 IEEE International Conference on Image Processing (ICIP), p. 1339-1343. (Year: 2021).*
Chen, B., Deng, W., Hu, J.: Mixed high-order attention network for person reidentification. In: ICCV, pp. 371-381 (2019).
Chen, J., Jiang, X., Wang, F., Zhang, J., Zheng. F., Sun, X., Zheng. W.S.: Learning 3d shape feature for texture-insensitive person re-identification. In: CVPR. pp. 8146-8155 (2021).
Cheng, D., Gong, Y., Zhou, S., Wang, J., Zheng, N.: Person re-identification by multi-channel parts-based cnn with improved triplet loss function. In: CVPR. pp. 1335-1344 (2016).

* cited by examiner

PERSON RE-IDENTIFICATION METHOD, COMPUTER-READABLE STORAGE MEDIUM, AND TERMINAL DEVICE

CROSS REFERENCE TO RELATED APPLICATION

The present disclosure claims priority to Chinese Patent Application No. 202210609192.0, filed May 31, 2022, which is hereby incorporated by reference herein as if set forth in its entirety.

BACKGROUND

1. Technical Field

The present disclosure relates to terminal device technology, and particularly to a person re-identification method, a computer-readable storage medium, and a terminal device.

2. Description of Related Art

Person re-identification is a technology that uses Computer vision technology to determine whether there is a specific person in an image or video sequence.

In the process of the development of the person re-identification technology from the traditional metric learning to the deeper and wider deep neural network learning, the measurement of distance is inevitable. The person re-identification technology needs to be able to effectively shorten the distance between the same classes and increase the distance between different classes in the feature space. Based on the measurement of distance, researchers have proposed many loss functions for supervising network learning. Among them, the absolute distance-based triplet loss function is the most widely used loss function which can achieve better training effect results in general cases.

However, for the scenes with small inter-class differences and large intra-class differences, the absolute distance-based triplet loss function has two inherent problems. First, there will be the intra-pair variation that results in too strict limits on the intra-class differences to affect the model training when the inter-class differences are small, while the limits on the intra-class differences will be too loose to affect the compactness of the model features when the intra-class differences are large. Second, the optimization gradient is unreasonable. When the inter-class differences are small, the negative sample features will be given a small gradient so that the negative sample features cannot quickly leave from the reference sample features, which results in that the trained model may easily shrink to the same point. As a result, the absolute distance-based triplet loss function will cause instability in model training, which leads to the poor discriminative and robustness of the features extracted by the trained model and therefore reduces the accuracy of person re-identification results.

BRIEF DESCRIPTION THE DRAWINGS

To describe the technical schemes in the embodiments of the present disclosure or in the prior art more clearly the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present: disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

The loss function is an integral part of a deep network model. During the training of the model, the loss function enhances the feature representation capability of the model by minimizing the error between the predicted value of the model and the true value of that. In vision tasks for fine-grained recognition such as person re-identification, the loss function usually optimizes both the inter-class distance and the intra-class distance so as to enhance the discriminative and robustness of the model.

Figure 1:
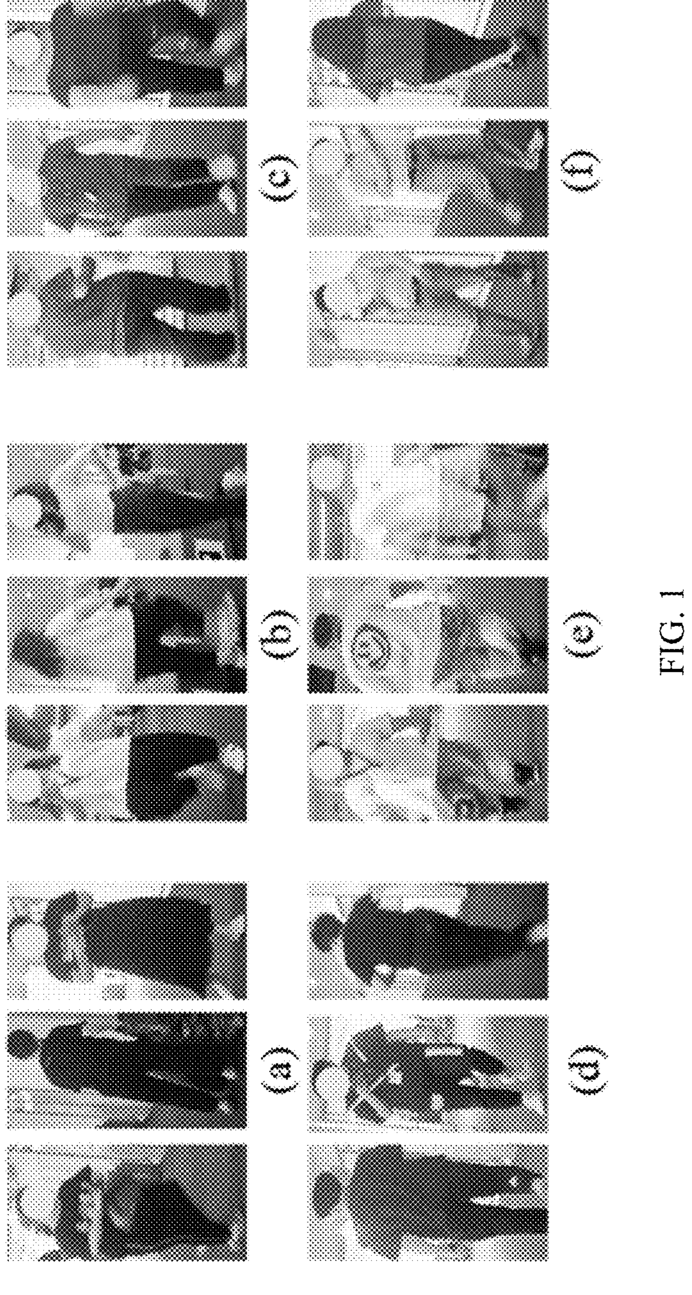
FIG. 1 is a schematic diagram of triplet image sets according to an embodiment of the present disclosure.

The triple loss function is the most common loss function in the vision tasks; which is often used in tasks such as face recognition, image classification, and person re-identification. The input of the triplet loss function is a feature triplet $\{f^{\alpha}, f^{p}, f^{n}\}$, where, $f^{\alpha}$, $f^{p}$, and $f^{n}$ are a reference image feature, a positive sample image feature and a negative sample image feature, respectively, in a triplet. FIG. 1 is a schematic diagram of triplet image sets according to an embodiment of the present disclosure. As shown in FIG. 1, the images in each triplet image set (i.e., set of triplet images that are generated based on image(s) captured by one or more cameras), from left to right, are a reference image, a positive sample image, and a negative sample image, respectively.

The above-mentioned absolute distance-based triplet loss function will limit the difference between a negative sample feature distance $D(f^{\alpha}, f^{n})$ and a positive sample feature distance $D(f^{\alpha}, f^{p})$ to be larger than a preset difference threshold, so as to achieve the optimization goal of increasing intra-class similarity and reducing inter-class similarity. In which, the positive sample feature distance is a distance between a reference image feature and a positive sample image feature, and the negative sample feature distance is a distance between the reference image feature and a negative sample image feature.

The absolute distance-based triplet loss function may be as an equation of:

$$L_{triplet} = \frac{1}{N_{tp}} \sum_{i=1}^{N_{tp}} \{D(f_i^a, f_i^p) - D(f_i^a, f_i^n) + \alpha\}_+;$$

where, $N_{tp}$ is a number of triples, i is a serial number, D is a function for calculating distance, $\alpha$ is the difference threshold, $\{*\}_+=\max\{*,0\}$, max is a function for calculating maximum value, and $I_{triplet}$ is the absolute distance-based triplet loss function.

In model training, the computational complexity of using all triples to train the model is $O(N^3)$, where N is the number of images in a training dataset. Therefore, in order to improve the training efficiency of the model, the set of triples are often selected by using the strategy of hard negative mining. As shown below, under the strategy of hard negative mining, the absolute distance-based triplet loss function may be as an equation of:

$$L_{triplet} = \frac{1}{N_{tp}} \sum_{i=1}^{P} \sum_{a=1}^{A} \left\{ \max_{p=1 \ldots A} D(f_i^a, f_i^p) - \min_{\substack{n=1 \ldots A \\ j=1 \ldots P \\ j \neq i}} D(f_i^a, f_j^n) + \alpha \right\}_+;$$

where, min is a function for calculating minimum value, j is a serial number, and P and A are a number of pedestrians in a training batch of the model and a number of images of each person to be re-identified, respectively.

However, in a person re-identification task including the triplet image set(s), different persons may dress similarly the difference $$D(f_i^a, f_j^n)$$

between classes is small), and the images of the same person often change dramatically in appearance (i.e., there's a large difference $$D(f_i^a, f_i^p)$$

within a class) due to changes in personal pose, camera viewing angle, and the like.

At this time, the absolute distance-based triplet loss function still limits the difference between the negative sample feature distance and the positive sample feature distance, which will cause bad consequences such as unstable training. For example, when the value of $\alpha$ is set to 0.4, for the triplet image sets in parts (a) and (d) of FIG. 1, since the negative sample is mage and the reference image are very similar, the value of the negative sample feature distance will be 0.5, then the absolute distance-based triplet loss function will require the value of the positive sample feature distance to be less that 0.1 so as to satisfy its limit, which will increase the difficulty of model optimization and cause instability in model training. In addition, if the value of the negative sample feature distance is too large (e.g., 1), the original loss will have no constraints. Furthermore, unreasonable gradients will be caused.

Therefore, when dealing with the problem of small inter-class differences and large intra-class differences that often occurs in fine-grained recognition tasks such as person re-identification, because the absolute distance-based triplet loss function only limits the absolute difference between the negative sample feature distance and the positive sample feature distance, the model will be impossible to be trained stably.

Considering the forgoing deficiencies of the absolute distance-based triplet loss function, a ratio-based triplet loss function is provided in the embodiments of the present disclosure. Unlike the absolute distance-based triplet loss function that limits the difference between the negative sample feature distance and the positive sample feature distance, the ratio-based triplet loss function limits a ratio of a positive sample feature distance to a negative sample feature distance to be less than a preset ratio threshold as an equation of:

$$L_{triple\_ratio} = \frac{1}{N_{tp}} \sum_{i=1}^{N_{tp}} \left\{ \frac{D(f_i^a, f_i^p)}{D(f_i^a, f_i^n)} - \beta \right\}_+;$$

where, $\beta$ is the ratio threshold, and $L_{triplet\_ratio}$ is the ratio-based triplet loss function.

Correspondingly, under the strategy of hard negative mining, the ratio-based triplet loss function will be as an equation of:

$$L_{triplet\_ratio} = \frac{1}{N_{tp}} \sum_{i=1}^{P} \sum_{a=1}^{A} \left\{ \max_{p=1 \ldots A} D(f_i^a, f_i^p) - \beta \times \min_{\substack{n=1 \ldots A \\ j=1 \ldots P \\ j \neq i}} D(f_i^a, f_j^n) \right\}_+.$$

In this embodiment, as an example, $\beta$ is a constant, and its specific value may be set according to the actual situation, for example, it can be set to 0.5 or other values, which is not limited herein.

The absolute distance-based triplet loss function will be compared with the ratio-based triplet loss function based on three cases as follows.

In the first case, for scenes with small inter-class differences and large intra-class differences such as the triplet image set in part (a) and (d) of FIG. 1, compared to the absolute distance-based triplet loss function, the training process of the ratio-based triplet loss function is more stable and robust. For example, when the value of β is set to 0.5, since the negative sample image is very similar to the reference image, the value of the negative sample feature distance is 0.5. At this time, the ratio-based triplet loss function requires the value of the positive sample feature distance to be less than 0.25 so as to satisfy the limit. In contrast, the absolute distance-based triplet loss function requires the value of the positive sample feature distance to be less than 0.10 (the value of α is 0.4).

In the second case, for scenes where both the inter-class and intra-class differences are small such as the triplet image sets in parts (b) and (e) of FIG. 1, the value of the negative sample feature distance will be 0.7. The absolute distance-based triplet loss function will require the value of the positive sample feature distance to be less than 0.3 (the value of α is 0.4), while the ratio-based triplet loss function will require the value of the positive sample feature distance to be less than 0.35 (the value of β is 0.5), Since the limit on the inter-class differences is lowered, the ratio-based triplet loss function in this case may harm the intra-class compactness.

In the third case, for scenes with large inter-class differences (there is large discriminativeness between different persons) and small intra-class differences such as the triplet image sets in parts (c) and (f) FIG. 1, since the negative sample feature distance is large enough while the positive samples feature distance is small enough, the limits of both the absolute distance-based triplet loss function and the ratio-based triplet loss function have been satisfied.

In the fourth case, for scenes with the negative sample feature distance that is too large, the original loss will have no constraints. For example, when the value of the negative sample feature distance is 1, the ratio-based triplet loss function requires the value of the positive sample feature distance to be less than 0.6, where the ratio is more reasonable because it is less than 0.5.

Based on the forgoing analysis, it can be seen that the ratio-based triplet loss function will appropriately relax the limit on the positive sample feature distance when the inter-class difference is very small, thereby improving the stability of training; while the ratio-based triplet loss function will instead break the intra-class compactness when the inter-class difference and the intra-class difference are both small.

Therefore, in this embodiment, as another example, the ratio-based triplet loss function may also be further improved so that β is no longer a constant but a variable which can adapt to the change of the negative sample feature distance, and the ratio-based triplet loss function will be as equations of:

$$L_{triplet\_ratio} = \frac{1}{N_{tp}} \sum_{i=1}^{N_{tp}} \left\{ \frac{D(f_i^a, f_i^p)}{D(f_i^a, f_i^n)} - F(D(f_i^a, f_i^n)) \right\}_+ ; \text{ and}$$

$$\beta = F(D(f_i^a, f_i^n)) = \begin{cases} \beta_i & D(f_i^a, f_i^n) < D_1^{an} \\ k \times D(f_i^a, f_i^n) + b & D_1^{an} \le (D(f_i^a, f_i^n) \le D_2^{an} ; \\ \beta_2 & D(f_i^a, f_i^n) > D_2^{an} \end{cases}$$

where, F is preset functional relationship, $$k = \frac{\beta_1 - \beta_2}{D_1^{an} - D_2^{an}},\ b = \beta_2 - \frac{\beta_1 - \beta_2}{D_1^{an} - D_2^{an}} \times D_2^{an},$$

$\beta_1$ is a preset lower limit of ratio threshold, $\beta_2$ is a preset lower limit of ratio threshold, $$D_1^{an}$$

is a preset lower limit of distance, and $$D_2^{an}$$

is a preset upper limit of distance. The values of these hyperparameters may be set according to the actual situation, which is not limited herein.

Correspondingly, under the strategy of hard negative mining, the ratio-based triplet loss function will be as equations of:

$$L_{triplet\_ratio} = \frac{1}{N_{tp}} \sum_{i=1}^{P} \sum_{a=1}^{A} \left\{ \max_{p=1 \ldots A} D(f_i^a, f_i^p) - F(D(f_i^a, f_j^n)) \times \min_{\substack{n=1 \ldots A \\ j=1 \ldots P \\ j \neq i}} D(f_i^a, f_j^n) \right\}_+ ; \text{ and}$$

$$\beta = F(D(f_i^a, f_j^n)) = \begin{cases} \beta_1 & D(f_i^a, f_j^n) < D_1^{an} \\ k \times D(f_i^a, f_j^n) + b & D_1^{an} \le (D(f_i^a, f_j^n) \le D_2^{an} ; \\ \beta_2 & D(f_i^a, f_j^n) > D_2^{an} \end{cases}$$

Figure 2:
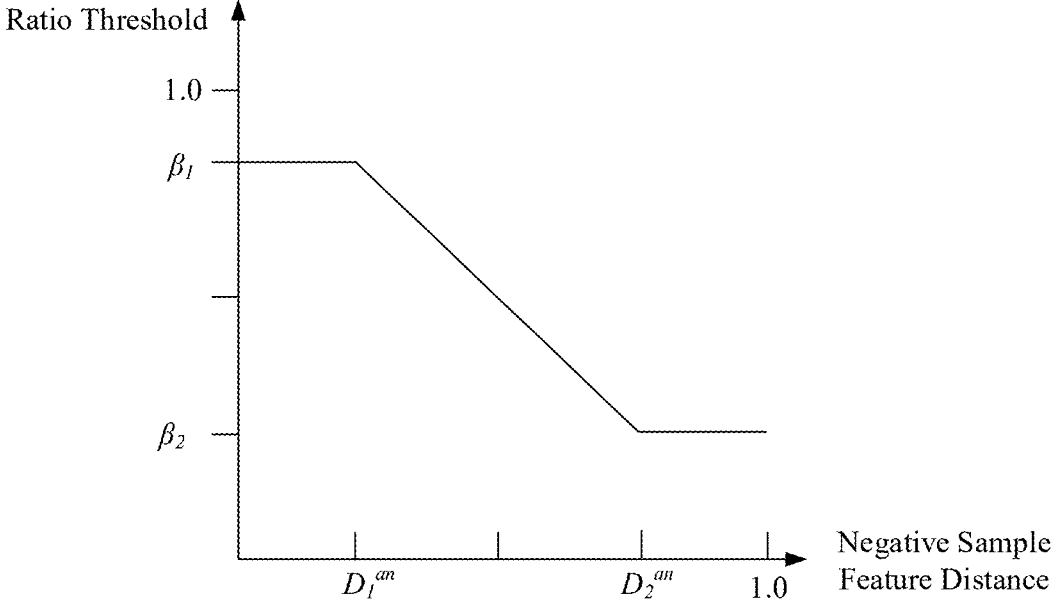
FIG. 2 is a schematic diagram of a functional relationship between a ratio threshold and a negative sample feature distance according to an embodiment of the present disclosure.

After this improvement, β becomes a piecewise function as shown in FIG. 2. When the value of the negative sample feature distance is large, the value of β becomes smaller accordingly so as to maintain a strong limit on the positive sample feature distance without destroying the intra-class compactness and when the value of the negative sample feature distance is small, the value of β becomes larger accordingly so as to relax the limit on the positive sample feature distance to maintain the stability of training.

During the training of the person re-identification model, any one of the above-mentioned ratio-based triplet loss functions may be used to obtain a person re-identification model with stronger discrimination and robustness for image features.

Figure 3:
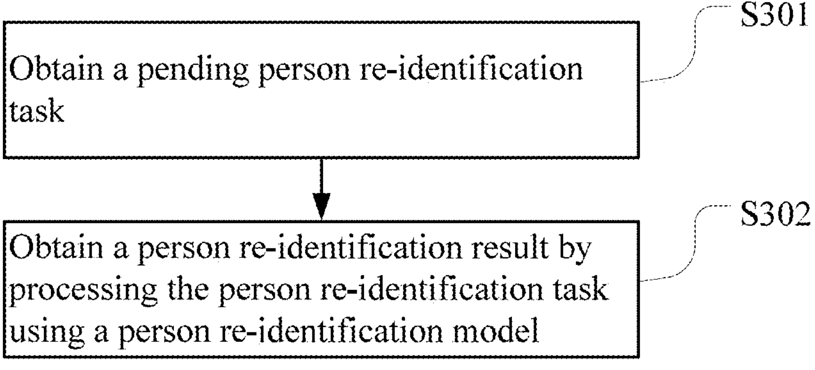
FIG. 3 is a flow chart of a person re-identification method according to an embodiment of the present disclosure.

After obtaining the person re-identification model, it can be applied to the actual person re-identification task. FIG. 3 is a flow chart of a person re-identification method according to an embodiment of the present disclosure. In this embodiment, the person re-identification method is a computer-implemented method executable for (a processor of) a terminal device (e.g., a webcam and a mobile phone) having a camera camera 53 of a terminal device 5 shown in FIG. 5). In other embodiments, the method may be implemented through a person re-identification apparatus shown m FIG. 4 or the terminal device 5 shown in FIG. 5. As shown in FIG. 3, in this embodiment, the person re-identification method may include the following steps.

S301: obtaining a pending person re-identification task. In this embodiment, the pending person re-identification task includes triplet image set(s), where the triplet image set(s) are generated based on image(s) captured by the camera of the terminal device.

S302: obtaining a person re-identification result by processing the person re-identification task using a person re-identification model.

To sum up, in this embodiment, a preset ratio-based triplet loss function is used as a loss function during training the model. The ratio-based triplet loss function limits a ratio of a positive sample feature distance to a negative sample feature distance to be less than a preset ratio threshold. The positive sample feature distance is a distance between a reference image feature and a positive sample image feature, and the negative sample feature distance is a distance between the reference image feature and a negative sample image feature. Compared with the existing absolute distance-based triplet loss function, in the case of small inter-class differences and large at differences, the ratio-based triplet loss function can effectively improve the stability of model training, the features extracted by the trained model are more discriminative and robust, thereby improving the accuracy of person re-identification results.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 4:
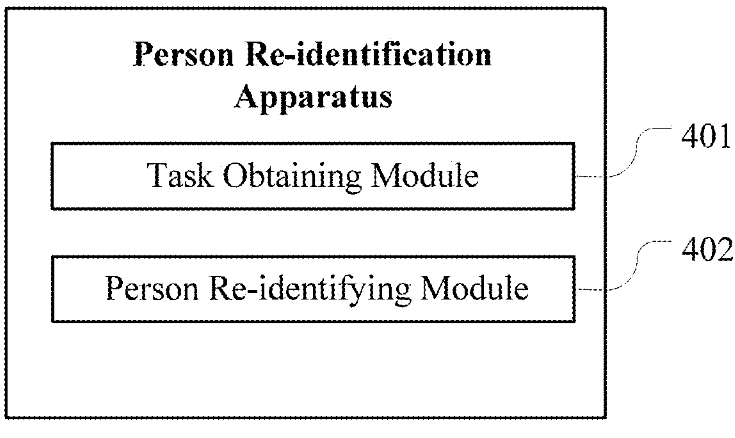
FIG. 4 is a schematic block diagram of a person re-identification apparatus according to an embodiment of the present disclosure.

FIG. 4 is a schematic block diagram of a person re-identification apparatus according to an embodiment of the present disclosure. A person re-identification apparatus corresponding to the person re-identification method described in the above embodiment is provided. The person re-identification apparatus (e.g., the terminal device 5 shown in FIG. 5) may be, for example, a webcam, a mobile phone, or the like that has a camera.

In this embodiment, the person re-identification apparatus may include:

a task obtaining module 401 configured to obtain, from the terminal device, a pending person re-identification task executed by the processor of the terminal device; and a person re-identifying module 402 configured to obtain a person re-identification result by processing the person re-identification task using a preset person re-identification model trained by taking a preset ratio-based triplet loss function that limits a ratio of a positive sample feature distance to a negative sample feature distance to less than a preset ratio threshold as a loss function; where the positive sample feature distance is a distance between a reference image feature and a positive sample image feature, and the negative sample feature distance is a distance between the reference image feature and a negative sample image feature.

In one embodiment, as an example, where the ratio-based triplet loss function may be:

$$L_{triplet\_ratio} = \frac{1}{N_{tp}} \sum_{i=1}^{N_{tp}} \left\{ \frac{D(f_i^a, f_i^p)}{D(f_i^a, f_i^n)} - \beta \right\}_+ ;$$

where, $N_{tp}$ is a number of triples, i is a serial number, $f^\alpha$, $f^p$ and $f^n$ are the reference image feature, the positive sample image feature and the negative sample image feature, respectively, D is a function for calculating distance, β is the ratio threshold, $\{*\}_+=\max\{*,0\}$, max is a function for calculating maximum value, and $L_{triplet\_ratio}$ is the ratio-based triplet loss function.

In one embodiment, as an example, where the ratio threshold may be a variable satisfying an equation of:

$$\beta = F(D(f_i^a, f_i^n)) = \begin{cases} \beta_1 & D(f_i^a, f_j^n) < D_1^{an} \\ k \times D(f_i^a, f_j^n) + b & D_1^{an} \le (D(f_i^a, f_j^n) \le D_2^{an} ; \\ \beta_2 & D(f_i^a, f_j^n) > D_2^{an} \end{cases}$$

where, $$k = \frac{\beta_1 - \beta_2}{D_1^{an} - D_2^{an}},\ b = \beta_2 - \frac{\beta_1 - \beta_2}{D_1^{an} - D_2^{an}} \times D_2^{an},$$

$\beta_1$ is a preset upper limit of ratio threshold, $\beta_2$ is a preset lower limit of ratio threshold, $$D_1^{an}$$

is a preset lower limit of distance, $$D_2^{an}$$

is a preset upper limit of distance, and F is a preset functional relationship.

In one embodiment, as an example, where the ratio threshold may also be a constant.

In one embodiment, as another example, where the ratio-based triplet loss function may be:

$$L_{triplet\_ratio} = \frac{1}{N_{tp}} \sum_{i=1}^{P} \sum_{a=1}^{A} \left\{ \max_{p=1 \ldots A} D(f_i^a, f_i^p) - \beta \times \min_{\substack{n=1 \ldots A \\ j=1 \ldots P \\ j \neq i}} D(f_i^a, f_j^n) \right\}_+ ;$$

where, $N_{tp}$ is a number of triples, i and j are serial numbers, $f^\alpha$, $f^p$ and $f^n$ are the reference image feature, the positive sample image feature and the negative sample image feature, respectively, D is a function for calculating distance, β is the ratio threshold, $\{*\}_+=\max\{*,0\}$, max is a function for calculating maximum value, min is a function for calculating minimum value, P and A are a number of pedestrians in a training batch of the model and a number of images of each person to be re-identified, respectively, and $L_{triplet\_ratio}$ is the ratio-based triplet loss function.

In one embodiment, as another example, where the ratio threshold may be a variable satisfying an equation of $$\beta = F(D(f_i^a, f_i^n)) = \begin{cases} \beta_1 & D(f_i^a, f_j^n) < D_1^{an} \\ k \times D(f_i^a, f_j^n) + b & D_1^{an} \le (D(f_i^a, f_j^n) \le D_2^{an} ; \\ \beta_2 & D(f_i^a, f_j^n) > D_2^{an} \end{cases}$$

where, $$k = \frac{\beta_1 - \beta_2}{D_1^{an} - D_2^{an}},\ b = \beta_2 - \frac{\beta_1 - \beta_2}{D_1^{an} - D_2^{an}} \times D_2^{an},$$

$\beta_1$ is a preset lower limit of ratio threshold, $\beta_2$ is a preset lower limit of ratio threshold, $$D_1^{an}$$

is a preset lower limit of distance, $$D_2^{an}$$

is a preset upper limit of distance, and F is a preset functional relationship.

In one embodiment, as another example, where in the ratio threshold may also be a constant.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 5:
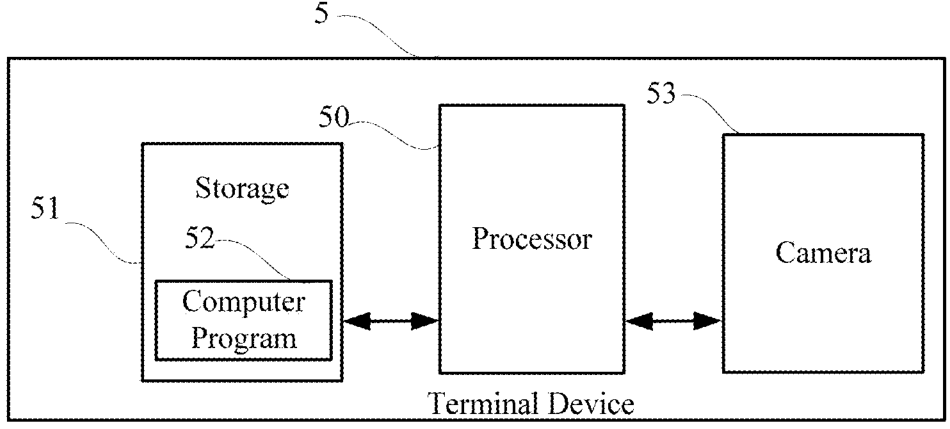
FIG. 5 is a schematic block diagram of a terminal device according to an embodiment of the present disclosure.

FIG. 5 is a schematic block diagram of a terminal device according to an embodiment of the present disclosure. A terminal device 5, for example, a webcam, a mobile phone, or the like, is provided. For convenience of description, only parts related to this embodiment are shown.

As shown in FIG. 5, in this embodiment, the terminal device 5 may include a processor 50, a storage 51, a computer program 52 stored in the storage 51 and executable on the processor 50, and a camera 53. When executing (instructions in) the computer program 52, the processor 50 implements the steps in the above-mentioned embodiments of the person re-identification method, for example, steps S301-S302 shown in FIG. 3. Alternatively, when the processor 50 executes the (instructions in) computer program 52, the functions of each module/unit in the above-mentioned device embodiments, for example, the functions of the modules 401-402 shown in FIG. 4 are implemented.

Exemplarily, the computer program 52 may be divide into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the terminal device 5.

The terminal device 5 may be a computing device such as a mobile phone, a tablet computer, a desktop computer, a notebook computer, a pocket personal computer, and a terminal equipment. It can be understood by those skilled in the art that FIG. 5 is merely an example of the terminal device 5 and does not constitute a limitation on the terminal device 5, and may include more or fewer components than those shown in the figure, or a combination of some components or different components. For example, the terminal device 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be an conventional processor.

The storage 51 may be an internal storage unit of the terminal device 5, for example, a hard disk or a memory of the terminal device 5. The storage 51 may also be an external storage device of the terminal device 5, for example, a plug-in hard disk, a smart media card (SMC), a secure digital (SD) card, flash card, and the like, which is equipped on the terminal device 5. Furthermore, the storage 51 may further include both an internal storage unit and an external storage device, of the terminal device 5. The storage 51 is configured to store the computer program 52 and other programs and data required by the terminal device 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions m other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware car software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented person re-identification method for a terminal device having a camera, comprising:

obtaining, from the terminal device, a person re-identification task including at least a triplet image set generated based on at least an image captured by the camera of the terminal device; and obtaining a person re-identification result by processing the obtained person re-identification task using a preset person re-identification model trained by taking a preset ratio-based triplet loss function that limits a ratio of a positive sample feature distance to a negative sample feature distance to less than a preset ratio threshold as a loss function; wherein the positive sample feature distance is a distance between a reference image feature and a positive sample image feature, and the negative sample feature distance is a distance between the reference image feature and a negative sample image feature; and wherein the ratio threshold is a variable, and the ratio threshold is negatively correlated with the negative sample feature distance;

wherein the ratio-based triplet loss function is:

$$L_{triplet\_ratio} = \frac{1}{N_{tp}} \sum_{i=1}^{P} \sum_{a=1}^{A} \left\{ \max_{p=1 \ldots A} D(f_i^a, f_i^p) - \beta \times \min_{\substack{n=1 \ldots A \\ j=1 \ldots P \\ j \neq i}} D(f_i^a, f_i^P) \right\}_+ ;$$

where, $N_{tp}$ is a number of triples, i and j are serial numbers, $f^\alpha$, $f^p$ and $f^n$ are the reference image feature, the positive sample image feature and the negative sample image feature, respectively, D is a function for calculating distance, β is the ratio threshold, $\{*\}_+ = \max\{*, 0\}$, max is a function for calculating maximum value, min is a function for calculating minimum value, P and A are a number of pedestrians in a training batch of the model and a number of images of each person to be re-identified, respectively, and $L_{triplet\_ratio}$ is the ratio-based triplet loss function; and wherein the ratio threshold is a variable satisfying an equation of:

$$\beta = F(D(f_i^a, f_i^n)) = \begin{cases} \beta_1 & D(f_i^a, f_j^n) < D_1^{an} \\ k \times D(f_i^a, f_j^n) + b & D_1^{an} \le (D(f_i^a, f_j^n) \le D_2^{an} \\ \beta_2 & D(f_i^a, f_j^n) > D_2^{an} \end{cases} ;$$

where, $$k = \frac{\beta_1 - \beta_2}{D_1^{an} - D_2^{an}}, \ b = \beta_2 - \frac{\beta_1 - \beta_2}{D_1^{an} - D_2^{an}} \times D_2^{an},$$

$\beta_1$ is a preset upper limit of ratio threshold, $\beta_2$ is a preset lower limit of ratio threshold, $$D_1^{an}$$

is a preset lower limit of distance, $$D_2^{an}$$

is a preset upper limit of distance, and F is a preset functional relationship.

2. A non-transitory computer-readable storage medium for storing one or more computer programs, wherein the one or more computer programs comprise:

instructions for obtaining, from a terminal device, a person re-identification task including at least a triplet image set generated based on at least an image captured by a camera of the terminal device; and instructions for obtaining a person re-identification result by processing the obtained person re-identification task using a preset person re-identification model trained by taking a preset ratio-based triplet loss function that limits a ratio of a positive sample feature distance to a negative sample feature distance to less than a preset ratio threshold as a loss function;

wherein the positive sample feature distance is a distance between a reference image feature and a positive sample image feature, and the negative sample feature distance is a distance between the reference image feature and a negative sample image feature; and wherein the ratio threshold is a variable, and the ratio threshold is negatively correlated with the negative sample feature distance;

wherein the ratio-based triplet loss function is:

$$L_{triplet\_ratio} = \frac{1}{N_{tp}} \sum_{i=1}^{P} \sum_{a=1}^{A} \left\{ \max_{p=1 \ldots A} D(f_i^a, f_i^p) - \beta \times \min_{\substack{n=1 \ldots A \\ j=1 \ldots P \\ j \neq i}} D(f_i^a, f_i^P) \right\}_+ ;$$

where, $N_{tp}$ is a number of triples, i and j are serial numbers, $f^{\alpha}$, $f^p$ and $f^n$ are the reference image feature, the positive sample image feature and the negative sample image feature, respectively, D is a function for calculating distance, β is the ratio threshold, $\{*\}_+=\max\{*, 0\}$, max is a function for calculating maximum value, min is a function for calculating minimum value, P and A are a number of pedestrians in a training batch of the model and a number of images of each person to be re-identified, respectively, and $L_{triplet\_ratio}$ is the ratio-based triplet loss function; and wherein the ratio threshold is a variable satisfying an equation of:

$$\beta = F\left(D\left(f_i^a, f_j^n\right)\right) = \begin{cases} \beta_1 & D\left(f_i^a, f_j^n\right) < D_1^{an} \\ k \times D\left(f_i^a, f_j^n\right) + b & D_1^{an} \le D\left(f_i^a, f_j^n\right) \le D_2^{an} \\ \beta_2 & D\left(f_i^a, f_j^n\right) > D_2^{an} \end{cases} ;$$

where, $$k = \frac{\beta_1 - \beta_2}{D_1^{an} - D_2^{an}},\ b = \beta_2 - \frac{\beta_1 - \beta_2}{D_1^{an} - D_2^{an}} \times D_2^{an},$$

$\beta_1$ is a preset upper limit of ratio threshold, $\beta_2$ is a preset lower limit of ratio threshold, $$D_1^{an}$$

is a preset lower limit of distance, $$D_2^{an}$$

is a preset upper limit of distance, and F is a preset functional relationship.

3. A terminal device, comprising:

a camera, a processor;

a memory coupled to the processor; and one or more computer programs stored in the memory and executable on the processor;

wherein, the one or more computer programs comprise:

instructions for obtaining, from the terminal device, a person re-identification task including at least a triplet image set generated based on at least an image captured by the camera; and instructions for obtaining a person re-identification result by processing the obtained person re-identification task using a preset person re-identification model trained by taking a preset ratio-based triplet loss function that limits a ratio of a positive sample feature distance to a negative sample feature distance to less than a preset ratio threshold as a loss function;

wherein the positive sample feature distance is a distance between a reference image feature and a positive sample image feature, and the negative sample feature distance is a distance between the reference image feature and a negative sample image feature; and wherein the ratio threshold is a variable, and the ratio threshold is negatively correlated with the negative sample feature distance;

wherein the ratio-based triplet loss function is:

$$L_{triplet\_ratio} = \frac{1}{N_{tp}} \sum_{i=1}^{P} \sum_{a=1}^{A} \left\{ \max_{p=1 \ldots A} D(f_i^a, f_i^p) - \beta \times \min_{\substack{n=1 \ldots A \\ j=1 \ldots P \\ j \neq i}} D(f_i^a, f_i^P) \right\}_+ ;$$

where, $N_{tp}$ is a number of triples, i and j are serial numbers, $f^{\alpha}$, $f^p$ and $f^n$ are the reference image feature, the positive sample image feature and the negative sample image feature, respectively, D is a function for calculating distance, β is the ratio threshold, $\{*\}_+=\max\{*, 0\}$, max is a function for calculating maximum value, min is a function for calculating minimum value, P and A are a number of pedestrians in a training batch of the model and a number of images of each person to be re-identified, respectively, and $L_{triplet\_ratio}$ is the ratio-based triplet loss function; and wherein the ratio threshold is a variable satisfying an equation of:

$$\beta = F\left(D\left(f_i^a, f_j^n\right)\right) = \begin{cases} \beta_1 & D\left(f_i^a, f_j^n\right) < D_1^{an} \\ k \times D\left(f_i^a, f_j^n\right) + b & D_1^{an} \le D\left(f_i^a, f_j^n\right) \le D_2^{an} \\ \beta_2 & D\left(f_i^a, f_j^n\right) > D_2^{an} \end{cases} ;$$

where, $$k = \frac{\beta_1 - \beta_2}{D_1^{an} - D_2^{an}},\ b = \beta_2 - \frac{\beta_1 - \beta_2}{D_1^{an} - D_2^{an}} \times D_2^{an},$$

$\beta_1$ is a preset upper limit of ratio threshold, $\beta_2$ is a preset lower limit of ratio threshold, $$D_1^{an}$$

is a preset lower limit of distance, $$D_2^{an}$$

is a preset upper limit of distance, and F is a preset functional relationship.

* * * * *